Jan. 9, 1962 S. H. FISTEDIS 3,015,912
FOUNDATION STRUCTURE
Filed May 23, 1957 2 Sheets-Sheet 1
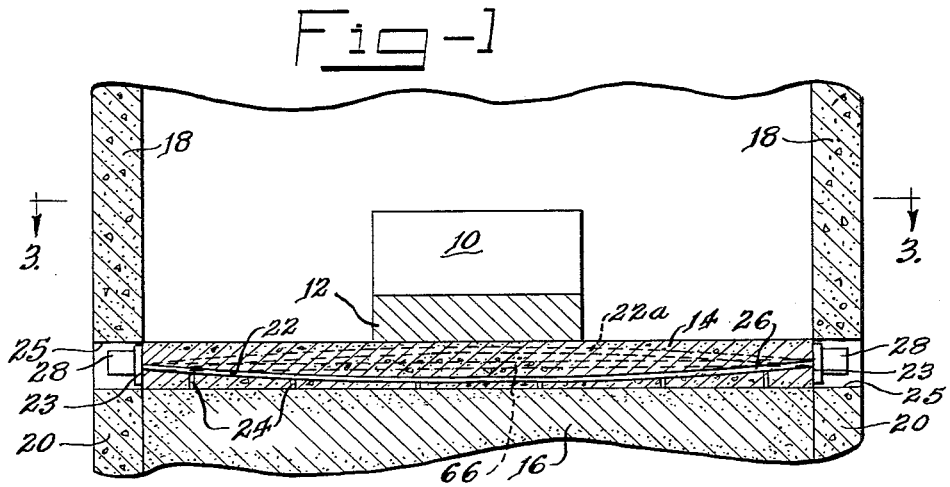
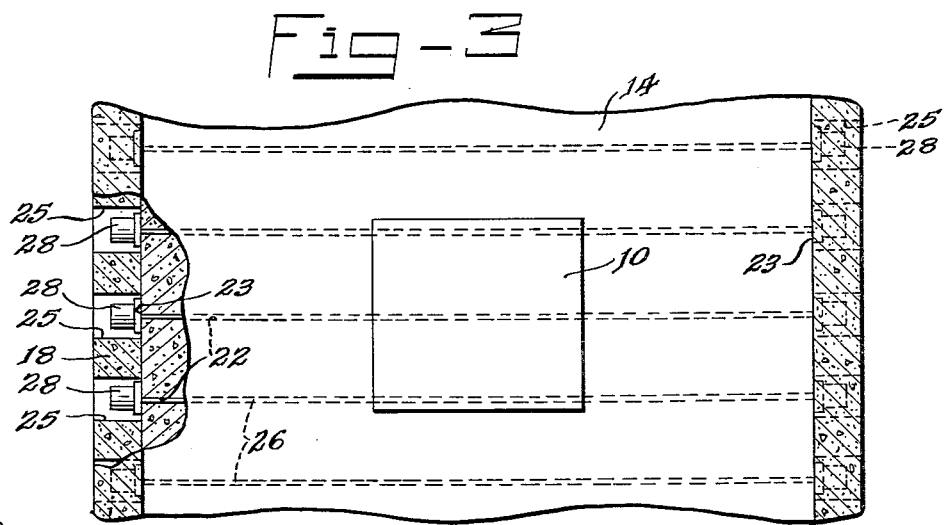
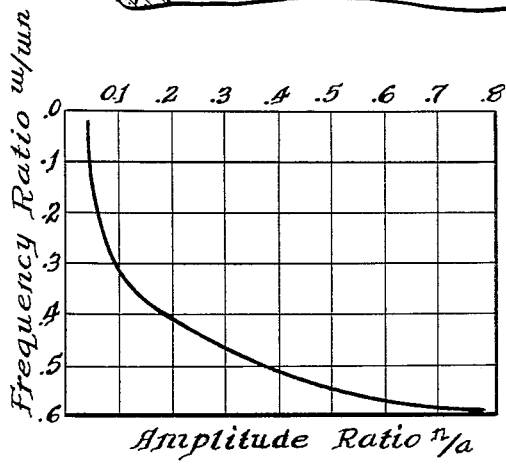
Inventor
Stanley H. Fistedis
Graf, Newman & Burmeister
Attorney Jan. 9, 1962 S. H. FISTEDIS 3,015,912
FOUNDATION STRUCTURE
Filed May 23, 1957 2 Sheets-Sheet 2
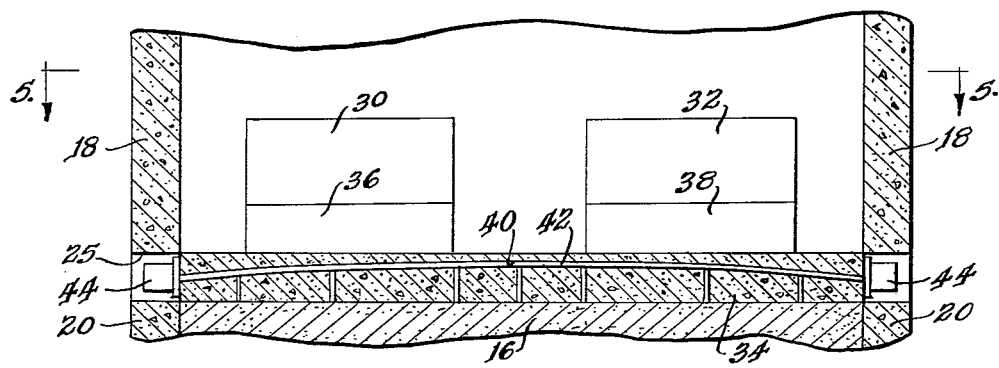
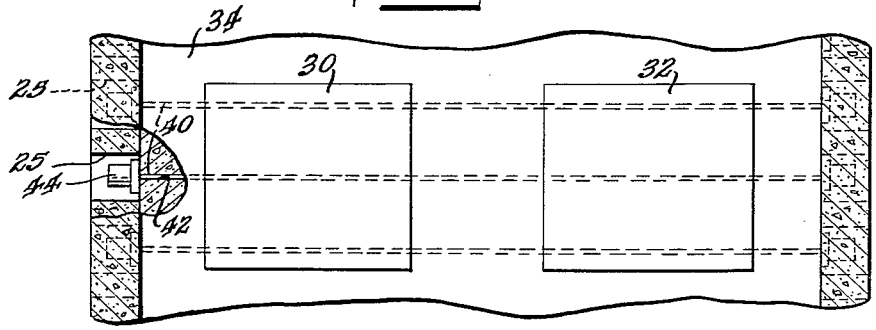
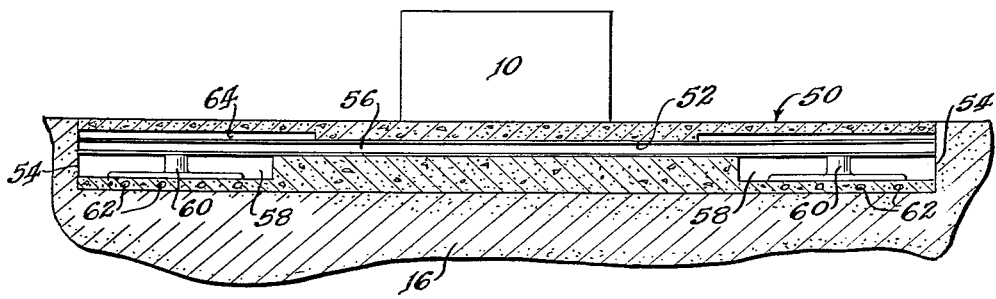
Inventor
Stanley H. Fistedis
Graf, Thurman & Burmeister
Attorneys 3,015,912
FOUNDATION STRUCTURE
Stanley H. Fistedis, Downers Grove, Ill.
(500 N. Parkwood, Park Ridge, Ill.)
Filed May 23, 1957, Ser. No. 663,568
3 Claims. (Cl. 50—532)

The present invention relates generally to devices for mounting vibrating machines, and more particularly to foundation structures for mounting vibrating machines on the soil.

Even though engineers have had much experience in constructing machines, such as engines and compressors, with a minimum of vibration resulting from operation thereof, such machines continue to have characteristic vibrations. As a result, it is necessary to provide a mounting structure for vibrating machines which will minimize the transmission of the vibrations from the vibrating machine to other portions of the building in which the machine is housed. Conventionally, the mounting structure for vibrating machines is built more ruggedly and with heavier and stronger materials in order to withstand the resulting vibrations than would otherwise be required. Occasionally the magnitude of the vibrations transmitted from a vibrating machine to the other portions of the structure exceed the permissible limits, and in spite of the costly precautions taken in constructing the mounting structure for the machine, operation of the machine results in inconvenience of personnel, improper functioning of installations, and in damage to both the machine and the building containing the mounting structure.

It is an object of the present invention to provide a mounting structure for a vibrating machine which is less expensive to construct and will withstand the vibrations transmitted thereto from the vibrating machine.

It is a further object of the present invention to provide a mounting structure for a vibrating machine which contains means for dampening the vibrations transmitted from the vibrating machine.

In spite of all the precautions which are generally adhered to in the construction of mounting structures for vibrating machines, occasionally such structures prove inadequate. It is a further object of the present invention to provide a method for dampening the vibrations transmitted from a vibrating machine to its mounting structure after the machine has been installed.

Further objects and adavantages of the present invention will become readily apparent to those skilled in the art from a further reading of this disclosure, particularly when viewed in the light of the drawings, in which:

FIGURE 1 is a sectional view of a building containing a machine constructed according to the teachings of the present invention;

FIGURE 2 is a graph illustrating the correlation between the ratio of the strain amplitude to free amplitude and the frequency ratio of the frequency of the exciting force and the natural frequency of the vibration of the soil;

FIGURE 3 is a sectional view taken along the line 3—3 of FIGURE 1;

FIGURE 4 is a vertical sectional view of a building containing two machines and constructed according to the teachings of the present invention;

FIGURE 5 is a sectional view taken along the line 5—5 of FIGURE 4; and

FIGURE 6 is a vertical sectional view of another embodiment of the present invention taken on a plane similar to that of FIGURE 1.

FIGURE 1 illustrates a building containing a machine, designated 10, and constructed according to the teachings of the present invention. As illustrated, the machine 10 rests directly upon a mounting or foundation structure which includes a concrete block 12 mounted centrally upon a rigid concrete mat 14, the mat 14 resting directly upon soil mass 16. The building is illustrated with walls 18 resting upon footings 20, although it is to be understood that the invention may be practiced with or without the walls and footings. Further, it is to be understood that the machine 10 may be mounted directly to the mat 14 without employing the block 12, the block 12 being employed to raise the machine to facilitate maintenance.

It is relatively a simple matter to design a rigid mat to withstand the static load of the machine 10. However, a vibrating machine, such as a reciprocating engine or compressor, presents a dynamic load, and if the frequency of the dynamic forces of the machine coincide with the natural frequency of the mat and soil mass, resonance and excessive vibration amplitudes result.

It has been found that a suitable foundation structure is achieved when the natural frequency of the soil mass is at least twice as large as the frequency of the unbalanced forces of the machine. Expressing this in mathematical terms, $$\frac{w}{w_\text{n}} < 0.5$$

in which $w$ is the frequency of the exciting or inertia force F, and $w_\text{n}$ is the natural frequency of vibration of the soil mass. Both the magnitude and the frequency of an exciting force F must be determined for the particular machine which is to be mounted, and this information is generally available from the manufacturer of the machine.

The natural frequency of the soil mass, however, is relatively difficult to determine. An approximate value of the natural frequency of the soil can be obtained from soil borings, deflection tests, or dynamic tests. The natural frequency of the soil mass is a function of the bearing pressure of the contact area between the soil mass and the rigid mat. In addition, stresses in the soil at a considerable depth below the surface introduced by adjacent structures, affect the natural frequency of the soil. Further, the area of the mat also influences the natural frequency of the soil, and the natural frequency of the soil mass is fundamentally related to the type of soil present. These factors are discussed in "Principles of Foundation Design for Engines and Compressors," by W. K. Newcomb, Transactions of the American Society of Mechanical Engineers, April 1951, G. P. Tschebotarioff and E. R. Ward, "The Resonance of Machine Foundations and the Soil Coefficients which Affect It," volume I of the Proceedings of the Second International Conference on Soil Mechanics and Foundation Engineering, Rotterdam, Holland, June 21 to 30, 1948, and T. Y. Sung, "Vibrations in Semi-Infinite Solids Due to Periodic Surface Loading," Symposium on Dynamic Testing of Soils, 56th Annual Meeting, American Society for Testing Materials, Atlantic City, N.J., July 2, 1953. In addition, it is believed that the height of the water table affects the natural frequency of the soil, and since the water table height may vary over a period of years, the suitability of a given foundation structure may also change with the passage of time. As a result, accurate determination of the natural frequency of the soil mass is difficult, and errors are likely to be experienced.

Having determined the desirable range of natural soil frequency and thus a desirable ratio of the frequency of the soil mass, the next step is to determine the magnitude of the free amplitude $a$ which is the amplitude with which the foundation structure and soil mass would vibrate if they were not restrained. This may be determined from FIGURE 2 which sets forth the ratio of the restrained amplitude $n$ to the free amplitude $a$ related to the ratio of the frequency of the exciting force to the natural frequency of the vibrating soil mass. Assuming an allowable amplitude of vibration, such as $n=0.002$ inch, the free amplitude can thus be determined.

The required weight of the foundation structure and machine which will produce the selected ratio of the exciting frequency to the natural frequency of the vibrating soil mass is then obtained from the equation, $$W = 35{,}200 \frac{F}{aw^2}$$

in which W is the combined weight of the foundation and machine, F is the maximum value of the inertia force, and $a$ is the free amplitude of the machine as determined above. The weight of the foundation structure alone, that is the rigid concrete mat 14 and the block 12, is the difference between W and the weight of the machine itself. The mat 14 is then constructed of the proper size to provide the desired bearing pressure upon the soil in order to preserve the selected ratio of the exciting frequency to the natural frequency of the soil mass used in the above calculations.

In spite of all precautions indicated above, a substantial vibrational amplitude may exist due to resonance of the machine 10 and the foundation structure. As a result, the foundation structure is conventionally provided with reinforcements and excessively strong materials to withstand possible vibrations in excess of those estimated. However, according to the teachings of the present invention, such reinforcing structures and the cost thereof, may be omitted.

According to the present invention, means are provided to alter the distribution of the subgrade reaction, or in other words to shift the bearing pressure between the soil mass and the portion directly below the machine in order to change the frequency of the combined soil mass, mat and machine, thereby avoiding resonance between the vibration frequency of the machine and the resonant frequency of the soil mass and mat.

In one construction illustrated in FIGURES 1 and 3, a plurality of channels 22 extend between the edges 23 of the concrete mat 14. These channels 22 are formed during the process of laying the mat 14 by placing conduit on supports or chairs 24, or positioning well greased rubber rope upon chairs in the desired path, or by any other acceptable method of post-tensioned concrete. If after installation of the machine 10, the vibrational properties of the mounting structure are satisfactory, there is no need to make further use of the channels 22. In this case, the ends of the channels 22 may be closed, as by grouting, and the channels left unused.

It is to be noted, that the edges 23 of the mat 14 are accessible as a result of slots 25 in the walls 18. The slots 25 permit access to the ends of the channels 22 for reasons which will be hereinafter more fully developed.

When the mat 14 rests upon a sandy soil mass 16, the portions of the soil adjacent to the perimeter of the mat enter into the subsoil reaction to a lesser extent than the portion of the soil immediately below the machine 10. Also, when the soil mass 16 is of a compact nature, such as clay, the portions of the soil mass immediately below the perimeter of the mat 14 enter into the subgrade reaction to a greater extent than the portion of the soil mass directly below the machine 10. The present invention alters the subgrade reaction with the mat 14 to change the relative contribution of the portions of the subgrade adjacent to the perimeter to the entire reaction.

In the event that the soil mass 16 is sandy, the subgrade reaction with the mat 14 may most readily be altered by decreasing the contribution of the portion of the soil mass beneath the machine 10. This may be accomplished by including in the mat the means for increasing the relative pressure of the perimetral portions of the mat 14 on the soil mass 16 relative to the pressure between the central portion of the mat and the soil mass 16. For this reason, the channels 22 are disposed in parabolic paths in planes normal to the mat with the ends of each channel 22 disposed on the neutral axis of the mat 14 and the central portions of the channel 22 are disposed below the neutral axis, as illustrated in FIGURE 1. The neutral axis of a beam or section of the mat is the axis on which bending stresses are zero. A perfect uniformly distributed equivalent load can be obtained by parabolic strands but this result can be approximated by circular strands or strands having a plurality of straight segments. A number of parallel channels are employed, as indicated in FIGURE 3, including at least one channel directly beneath the machine 10. Cables 26 are inserted into the channels 22 and secured to tensioning means 28 at each end, the tensioning means resting against the edges 23 of the mat 14. The tensioning means 28 may be a hydraulic jack, and the tensioning means post-tensions the cables 26 to stress the rigid concrete mat 14. Stressing the cable 26 results in a tendency to lift the central portion of the mat 14 and to depress the perimetral portions thereof, or in other words, to shift the load on the mat from the central portion to the perimetral portions thereof. This is due to the fact that the cables 26 follow parabolic paths. As a result, the reaction between the soil mass 16 and the mat 14 is altered to include a more substantial contribution from the portions of the subgrade adjacent to the perimeter of the mat 14.

The process of post-tensioning the mat may be accomplished with the machine 10 in full operation. As a result, the magnitude of the vibration of the machine may be continuously monitored during the tensioning operation, and the hydraulic jacks 28 can be employed to place the desired tension on each of the cables 26 which will reduce the magnitude of the vibrations of the machine 10 to permissible and suitable limits. The tension of the cables 26 may be then released from the jacks 28 and directly placed on the concrete mat 14, in a manner well known to the art.

The effect of prestressing the concrete with a single cable is approximately given by the equation $$T = rz = \frac{L^2 + 4e^2}{8e} z$$

where T is the tension in the cable 26, $r$ is the radius of curvature of the cable 26, $z$ is the equivalent uniform distributed load resulting from prestressing, and $e$ is the eccentricity, i.e., the distance between parallel horizontal lines passing through the ends of the cable and the central point thereof.

*Example*

The mat 14 is a rigid concrete slab resting upon a medium sandy soil mass 16. The mat has dimensions of 30 feet long, 15 feet wide, and 2 feet thick. The average bearing pressure of the mat on the soil mass 16 is 2,000 pounds per square foot. The cables 26 extend into the mat from the ends thereof along a line disposed centrally between the top and bottom of the ends of the mat, and an eccentricity of 9 inches at the center of the mat is provided by the channels 22. A one inch Roebling strand is employed for each of the cables 26, and a tension of 90,000 pounds is applied thereto by the tensioning means 28. The maximum equivalent distributed load is therefore equal to 600 pounds per square foot. As a result, there is a maximum decrease in the bearing pressure at the center of the mat 14 immediately below the machine 10 of 600 pounds per square foot, reducing the net bearing pressure at this point to a minimum of 1400 pounds per square foot. There is also an increase in the bearing pressure about the perimeter of the mat to compensate for this decrease at the center thereof. The number of cables will determine how close this maximum equivalent distributed load approaches the maximum, and it may be reduced by decreasing the number of cables or the tension on the cables.

As illustrated above, the channels 22 extend along the length of the mat, although it is to be understood that the channels could also be provided along the width of the mat, and that the shift in the bearing pressure between the mat and the soil mass 16 is additive. However, for most applications, the resonant frequency of the soil will be adequately shifted by employing one group of parallel channels 22.

If clay soil is disposed beneath the rigid mat 14, the above solution would not be effective due to the fact that the central portions of the mat already experience a lesser bearing pressure than the perimetral portions thereof. For this reason, the parabolic path of the channels 22 is reversed, so that the eccentricity of the channel is in the opposite direction to that shown in FIGURE 1. In other words, the path of the channels 22 remains parabolic, but the ends of the path are the lowest points therein. Again, the parabolic paths of the channels 22 are symmetrical about the center of the mat 14. For purposes of clarity, the dotted channel 22a has been illustrated in FIGURE 1 to show the parabolic path of the channel 22 when the mat 14 rests upon clay. It is also clear, that tensioning a cable 26 in the channel 22a will increase the bearing pressure between the central portion of the mat 14 and the adjacent soil mass 16, thereby reducing the bearing pressure at the perimetral portions of the mat 14. The net effect of this post-tensioning is to reduce the contribution of the perimetral portions of the soil 16 to the total subsoil mat reaction, and change the resonant frequency of the soil mass and mat.

As illustrated in FIGURE 4, the present invention may also be applied where more than one machine is mounted on a common mat, two machines 30 and 32 being illustrated mounted on a single rigid mat 34. The mat 34 is an elongated concrete mat, and mounting blocks 36 and 38 are disposed between the machines 30 and 32 and the mat 34, respectively. As illustrated, the machines 30 and 32 are mounted upon the longitudinal axis of the mat on opposite sides of the center line thereof. It can be expected that the central portion of the mat will have a different bearing pressure relative to the soil mass 16 disposed beneath the mat 34 than the perimetral portions of the mat. This difference in bearing pressure between central portion and perimetral portions may be minimized as shown below, thus reducing the requirements on the mat itself and its cost.

The mat 34 is provided with a plurality of channels 40 which extend parallel to the longitudinal axis of the mat from the edges thereof. The channels 40 follow a parabolic path with an eccentricity selected to reduce the difference of the bearing pressures. As illustrated in FIGURE 4, the ends of each channel are located on the neutral axis of the mat below the central portion of the channel. Cables 42 are disposed within the channels 40, and tension means 44 are positioned at the ends of the cables 42 in abutment with the mat to tension the cables.

If it is found that excessive vibrations occur when the two machines 30 and 32 are operating, these vibrations can be substantially reduced by tensioning the cables 42 and thereby shifting the bearing pressure between the mat and the soil 16 to change the bearing pressure at the central portion of the mat. As a result, the natural frequency of the soil and mat is altered. Further, the mat 34 may be constructed in a lighter manner if post-tensioning of the cables is to be employed. Also, even when the cables 42 are intended for use under tension to shift the relative bearing pressure between the central and perimetral portions of the mat, the cables 42 may be used to shift the resonant frequency of the structure since additional pressure may be applied thereto for this purpose. Further, cables may be employed following parabolic paths parallel to the transverse axis of the mat to add to the effect of the cables 42.

From this disclosure, those skilled in the art will readily devise many equivalent structures within the intended scope of the invention. For example, other mathematical paths may be employed for the channels 22, 22a and 40 which will be effective in shifting the distribution of the mat subsoil reaction. The path which the channels 22, 22a and 40 follow must be a non-linear function in a plane normal to the machine carrying plane of the mat, that is the horizontal plane upon which the machine rests, and the function of each of the paths must be monotonic between the edge of the mat and the central portion thereof. Further, a linear path which traverses only a portion of the mat may be employed in order to shift the subsoil mat reaction.

Another device for accomplishing the present invention is illustrated in FIGURE 6. A rigid mat 50 of concrete rests upon the soil mass 16 and supports the machine 10 centrally thereof. At least one channel 52 extends horizontally through the mat 50 from the ends 54 thereof and passes beneath the machine 10. An I-beam 56 is disposed in the channel 52 and extends from the ends 54 of the mat 50.

A cavity 58 is disposed in the mat 50 below each end of the channel 52, and a jack 60 rests upon the mat 50 in each of the cavities 58. The jacks 60 abut and engage the ends of the I-beam 56. Steel bars 62 are disposed in the mat 50 beneath the jacks 60 to spread the force transmitted by the jacks.

The I-beam 56 abuts the upper wall of the channel 52 in the portion thereof beneath the machine 10, but the channel 52 has a larger vertical dimension adjacent to the edges 54 of the mat 50. The spaces, designated 64, between the upper surface of the I-beam 56 and the mat 50 are provided to permit the ends of the I-beam 56 to move upwardly without abutting the mat 50.

When the mat 50 is constructed, it is designed to have a resonant frequency in combination with the soil mass 16 and the machine 10 which differs from the vibration frequency of the machine 10, so that vibration will normally not be significant. However, if operation of the machine proves to create excessive vibration, the jacks 60 are adjusted to exert an upward force on the ends of the I-beam 56, thus reducing the bearing pressure between the region of the mat below the machine 10 and the soil mass 16. As was discussed in connection with the embodiment of FIGURE 1, the greatest change in the frequency of resonance resulting from this change in bearing pressure will be produced if the soil mass 16 is a sandy type of soil. However, if the soil mass 16 is a clay type soil, the jacks 60 would preferably be positioned above the I-beam and between the I-beam and the mat 50 in order to increase the bearing pressure of the portion of the mat below the machine 10.

One of the beneficial effects of prestressing the mat is to impart rigidity to the mat. This rigidity of itself may alter the mass of soil participating in the vibration and thus affect its natural frequency. Hence a straight cable 66 illustrated by dotted lines in FIGURE 1 extending through the mat will impart this rigidity and may improve the vibration characteristics of the mat.

It is also obvious that those skilled in the art can devise many other mechanical devices for accomplishing the present invention. It is therefore intended that the scope of the present invention be not limited by the foregoing disclosure but rather only by the appended claims.

The invention claimed is:

1. The method of manufacturing a foundation for a machine which produces vibrations comprising the steps of laying a concrete mat in contact with the surface of the earth said mat being provided with a plurality of channels disposed in spaced vertical planes the ends of each channel being disposed on a horizontal plane totally disposed on one side of the remainder of said channel, placing a strand in each channel, mounting the machine on the surface of the mat, operating the machine to vibrate the mat and earth therebeneath, and anchoring the strands at the ends of the channels and tensioning the strands to minimize the vibrations produced in the mat.

2. The method of manufacturing a foundation for a machine which produces vibrations comprising the steps of claim 1 wherein the mat is laid on sandy soil, and the channels provided have ends at opposite edges of the mat disposed on a horizontal plane and the remainder of the channels are disposed below said horizontal plane.

3. The method of manufacturing a foundation for a machine which produces vibrations comprising the steps of claim 1 wherein the mat is laid on clay soil, and the ends of the channels are disposed on a horizontal plane with the remainder of the channels disposed above said horizontal plane.

References Cited in the file of this patent

UNITED STATES PATENTS

| 825,903 | Hallberg | July 17, 1906 |
| 1,666,149 | Rosenzweig | Apr. 17, 1928 |
| 2,413,990 | Muntz | Jan. 7, 1947 |
| 2,590,685 | Coff | Mar. 25, 1952 |
| 2,786,349 | Coff | Mar. 26, 1957 |

FOREIGN PATENTS

| 674,000 | Great Britain | June 18, 1952 |

OTHER REFERENCES

Soil Mechanics, Foundations, and Earth Structures, 1952, McGraw-Hill Book Co. Inc., N.Y., pp. 568–571 and 588–592, by G. P. Tschebotarioff. (Copy in P.O. Scientific Library.)